(12) United States Patent
Chen (10) Patent No.: US 8,225,098 B2
(45) Date of Patent: Jul. 17, 2012

(54) DIRECT ANONYMOUS ATTESTATION USING BILINEAR MAPS

(75) Inventor: Liqun Chen, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 790 days.

(21) Appl. No.: 12/322,368

(22) Filed: Jan. 30, 2009

(65) Prior Publication Data

US 2009/0210716 A1    Aug. 20, 2009

(30) Foreign Application Priority Data

Jan. 30, 2008   (GB) .................................. 0801662.8

(51) Int. Cl.
  H04L 9/32        (2006.01)
  G06F 7/04        (2006.01)
  G06F 15/16       (2006.01)
  G06F 17/30       (2006.01)
  H04L 29/06       (2006.01)

(52) U.S. Cl. .......................................... 713/176; 726/10

(58) Field of Classification Search .................... 713/176
  See application file for complete search history.

(56) References Cited

U.S. PATENT DOCUMENTS

| 7,814,326 | B2 * | 10/2010 | Gentry | 713/176 |
|---|---|---|---|---|
| 7,844,614 | B2 * | 11/2010 | Brickell et al. | 707/756 |
| 8,078,876 | B2 * | 12/2011 | Brickell et al. | 713/176 |
| 2003/0177352 | A1 | 9/2003 | Camenisch et al. | |
| 2005/0022102 | A1 * | 1/2005 | Gentry | 715/500 |
| 2005/0268103 | A1 * | 12/2005 | Camenisch | 713/176 |
| 2006/0010079 | A1 | 1/2006 | Brickell | |
| 2006/0085637 | A1 | 4/2006 | Pinkas | |
| 2007/0101138 | A1 * | 5/2007 | Camenisch | 713/168 |
| 2007/0244833 | A1 * | 10/2007 | Camenisch | 705/71 |
| 2007/0245138 | A1 * | 10/2007 | Camenisch | 713/156 |
| 2008/0133926 | A1 * | 6/2008 | Gentry | 713/176 |
| 2008/0178005 | A1 * | 7/2008 | Gentry | 713/176 |
| 2008/0270786 | A1 * | 10/2008 | Brickell et al. | 713/155 |
| 2008/0270790 | A1 * | 10/2008 | Brickell et al. | 713/158 |
| 2008/0276084 | A1 * | 11/2008 | Camenisch | 713/156 |
| 2008/0307223 | A1 * | 12/2008 | Brickell et al. | 713/158 |
| 2008/0313465 | A1 * | 12/2008 | Gentry | 713/176 |
| 2009/0049300 | A1 * | 2/2009 | Camenisch | 713/176 |
| 2009/0129600 | A1 * | 5/2009 | Brickell et al. | 380/282 |
| 2009/0210705 | A1 * | 8/2009 | Chen | 713/158 |
| 2009/0271618 | A1 * | 10/2009 | Camenisch et al. | 713/155 |

(Continued)

FOREIGN PATENT DOCUMENTS

GB    2419262    4/2006

(Continued)

OTHER PUBLICATIONS

Ernie Brickell et al. A New Direct Anonymous Attestation Scheme from Bilinear Maps. 2008. Springer-Verlag Berlin Heidelberg. p. 166-178.*

(Continued)

*Primary Examiner* — Christian Laforgia (57) ABSTRACT

Direct Anonymous Attestation, DAA, involves a Signer entity using a credential supplied by an Issuer to attest its possession of a particular characteristic to a Verifier without the identity of the Signer being revealed. Security and performance improvements are disclosed where DAA is performed using a non-degenerate, computable, bilinear map with the credential being a CL-LRSW signature on a secret known only to the Signer.

25 Claims, 1 Drawing Sheet

U.S. PATENT DOCUMENTS

2010/0082973 A1* 4/2010 Brickell et al. ............... 713/155

FOREIGN PATENT DOCUMENTS

WO     WO 2004/104797 A1    12/2004

OTHER PUBLICATIONS

Barreto, P. S. L. M. et al. "Efficient algorithms for pairing-based cryptosystems" Advances in Cryptology, CRYPTO '02, vol. 2442 of LNCS, pp. 355-370, Springer, 2002.

Boneh, D. et al., "Identity-based encryption from the Weil pairing", Siam J. of Computing, vol. 32, No. 3, pp. 586-615 (2003).

Brickell, E. et al., "Direct anonymous attestation" Proceedings of the 11th ACM Conference on Computer and Communications Security, pp. 132-145. ACM Press (2004).

Camenisch, J. et al., "An efficient system for non-transferable anonymous credentials . . . " Adv in Cryptology, EUROCRYPT 2001, V. 2045, LCNS, p. 93-118, Springer 2001.

Camenisch, J. et al.,"Signature schemes and anonymous credentials from bilinear maps", Advances in Cryptology, CRYPTO '04, V. 3152, LNCS, p. 56-72. Springer 2004.

Camenisch, J. et al.,"Efficient group signature schemes for large groups" Advances in Cryptology—CRYPTO '97, vol. 1296 of LNCS, pp. 410-424. Springer, 1997.

Chen, L., "Direct Anonymous Attestation (DAA)" Hewlett Packard Laboratories, Bristol, slide presentation, pp. 1-51, Oct. 12, 2005.

Chen, L. et al., "Identity-based key agreement protocols from pairings" International Journal of Information Security, 6(4):213-241, Springer Berlin / Heidelberg, 2007.

Fiat, A. et al., "How to prove yourself: Practical solutions to identification and signature problems" Advances in Cryptology ; CRYPTO '86, vol. 263 of LNCS, pp. 186-194.

Galbraith, S.D. et al, "Implementing the Tate pairing" Proceedings of the 5th International Symposium on Algorithmic Number Theory, pp. 324-337, London, UK, Springer 2002.

TCG TPM Specification 1.2, available at <http://www.trustedcomputinggroup.org>. pp. 170-177, TCG Published, Copyright 2003-2006.

Brickell, E., et al. "Enhanced Privacy ID: A Direct Anonymous Attestation Scheme with Enhanced Revocation Capabilities", 6th Workshop on Privacy in the Electronic Society (WPES), Alexandria, Virginia, Oct. 2007.

Brickell, E., et al., "A New Direct Anonymous Attestation Scheme from Bilinear Maps", Proc. of Trust 2008, LNCS 4968, pp. 166-178, Springer-Verlag Berlin Heidelberg 2008.

Office Action dated Mar. 8, 2012, U.S. Appl. No. 12/378,996, filed Feb. 19, 2009.

* cited by examiner

Figure 1

DIRECT ANONYMOUS ATTESTATION USING BILINEAR MAPS

FIELD OF THE INVENTION

The present invention relates to methods and apparatus for implementing Direct Anonymous Attestation (DAA) using bilinear maps; DAA is a cryptographic mechanism that enables remote authentication of a user while preserving privacy under the user's control.

BACKGROUND OF THE INVENTION

A DAA scheme involves three types of entities: a DAA issuer, DAA signer, and DAA verifiers (herein respectively, Issuer, Signer, and Verifier). The Issuer is in charge of verifying the legitimacy of Signers to become members of a particular group (generally, all group members will possess a particular characteristic), and of issuing a membership credential, in the form of a signature of a Signer DAA secret, to each legitimate Signer to serve as an Issuer attestation of the Signer's group membership (possession of a particular characteristic). A Signer can prove its group membership to a Verifier by signing a DAA signature. The Verifier can verify the membership credential from the signature but he cannot learn the identity of the Signer.

Although DAA schemes can be applied in many situations, the original DAA scheme, (described in the paper: "Direct anonymous attestation" E. Brickell, J. Camenisch, and L. Chen; *Proceedings of the 11$^{th}$ ACM Conference on Computer and Communications Security*, pages 132-145. ACM Press, 2004) was devised for implementation by a Trusted Platform Module (TPM), an on-board hardware security component with limited storage space and communication capability that is intended to provide roots of trust for a computing platform (herein referred to as a "host"). For this application, the role of the Signer is spilt between a TPM and the host with the TPM being the real signer and holding the secret signing key,—the host, which has more computing resources, simply helps the TPM with the computation required of the Signer but is not allowed to learn the secret signing key.

A version of the original DAA scheme as applied to TPMs has been adopted by the Trusted Computing Group (TCG) an industry standardization body that aims to develop and promote an open industry standard for trusted computing hardware and software building blocks; the DAA scheme was standardized in the TCG TPM Specification 1.2, available at http://www.trustedcomputinggroup.org.

As is described in the above-referenced paper by Brickell, Camenisch, and Chen, the original DAA scheme employs the Camenisch-Lysyanskaya signature scheme under the strong RSA assumption (see: J. Camenisch and A. Lysyanskaya. "Efficient non-transferable anonymous multi-show credential system with optional anonymity revocation" B. Pfitzmann, editor, Advances in Cryptology, EUROCRYPT 2001, volume 2045 of LNCS, pages 93-118. Springer Verlag, 2001). The original DAA scheme also uses the Fiat-Shamir heuristic to turn knowledge proofs into signatures; this heuristic is described in the paper "How to prove yourself: Practical solutions to identification and signature problems" by A. Fiat and A. Shamir.—*Advances in Cryptology; CRYPTO '86*, volume 263 of LNCS, pages 186-194. Springer, 1987.

One limitation of the original DAA scheme is that the lengths of private keys and DAA signatures are quite large (typically around 670 bytes and 2800 bytes, respectively) which can be a significant drawback when implemented for devices with limited resources such as a small TPM.

A form of DAA scheme based on bilinear maps has recently been proposed by Ernie Brickell and Jiangtao Li (Intel Corporation). This bilinear-map DAA scheme is described in US published Patent Application US 2008/020786 and permits the use of shorter private keys and DAA signatures. The bilinear-map DAA scheme uses the Camenisch-Lysyanskaya signature scheme under the Lysyanskaya, Rivest, Sahai, and Wolf assumption and is referred to hereinafter simply as the "CL-LRSW" signature scheme. The CL-LRSW signature scheme is described in the paper "Signature schemes and anonymous credentials from bilinear maps", J. Camenisch and A. Lysyanskaya; *Advances in Cryptology, CRYPTO '04*, volume 3152 of LNCS, pages 56-72. Springer, 2004.

The present invention concerns an improved form of DAA scheme based on bilinear maps.

SUMMARY OF THE INVENTION

According to a first aspect of the present invention, there is provided a DAA method by which a Signer computing entity uses a credential supplied by an Issuer to prove to a Verifier, without the identity of the Signer being revealed, Issuer attestation to the Signer's possession of a particular characteristic, the method using a non-degenerate, computable, bilinear map e of the form: $G_1 \times G_2 \in G$ where $G_1$, $G_2$, G are cyclic groups, and the credential being a CL-LRSW signature on a secret f known only to the Signer; the method comprising the Signer computing entity:

forming an Alternative CL-LRSW signature by exponentiation, using a random exponent, of components of the credential;

forming a signature proof of knowledge, incorporating the Alternative CL-LRSW signature, to prove knowledge of the secret f and the random exponent;

sending the signature proof of knowledge to the Verifier; the Signer computing entity being in the form of a Host with an associated entity that possesses the characteristic attested to by the credential and holds the secret f secret from the Host; the Host and its associated entity cooperating in the generation of the signature proof of knowledge with the Host using a component of the Alternate CL-LRSW signature and the map e to compute an element in G which it then provides to the associated entity, and the associated entity using this element to compute a component of the signature proof of knowledge, the associated entity checking that the element provided by the Host belongs to G.

According to a second aspect of the present invention, there is provided a DAA method by which a Signer computing entity uses a credential supplied by an Issuer to prove to a Verifier, without the identity of the Signer being revealed, Issuer attestation to the Signer's possession of a particular characteristic, the method using a non-degenerate, computable, bilinear map e of the form: $G_1 \times G_2 \in G$ where $G_1$, $G_2$ G are cyclic groups, and the credential being a CL-LRSW signature on a secret f known only to the Signer; the method comprising the Signer computing entity:

computing an Alternative CL-LRSW signature by exponentiation, using a random exponent, of components of the credential;

computing a signature proof of knowledge, incorporating the Alternative CL-LRSW signature, to prove knowledge of the secret f and the random exponent;

sending the signature proof of knowledge to the Verifier; the Signer computing entity being in the form of a Host with an associated entity that possesses the characteristic attested to by the credential and holds the secret f secret from the Host;

the Host generating said random exponent and using it to form the Alternative CL-LRSW signature by exponentiation of the credential components.

According to a third aspect of the present invention, there is provided a DAA method in which a Signer computing entity uses a credential supplied by an Issuer to prove to a Verifier, without the identity of the Signer being revealed, Issuer attestation to the Signer's possession of a particular characteristic, the method using a non-degenerate, computable, bilinear map e of the form: $G_1 \times G_2 \epsilon G$ where $G_1$, $G_2$, G are cyclic groups, and the credential being a CL-LRSW signature on a secret f known only to the Signer; the method including the Signer computing entity forming an element B in G from a value w dependent on a basename of the Verifier by computing B as $e(H_3(w); H_3(w))$ where $H_3(w)$ is a MapToPoint function for mapping the value w to an element of G, that can guarantee nobody knows the discrete log relation between g and $H_3(w)$.

According to a fourth aspect of the present invention, there is provided a DAA method in which a Signer computing entity uses a credential supplied by an Issuer to prove to a Verifier, without the identity of the Signer being revealed, Issuer attestation to the Signer's possession of a particular characteristic, the method using a non-degenerate, computable, bilinear map e of the form: $G_1 \times G_2 \epsilon G$ where $G_1$, $G_2$, G are cyclic groups, and the credential being a CL-LRSW signature on a secret f known only to the Signer; the method including the Signer computing entity forming an element B in G from a value w dependent on a basename of the Verifier by computing B as $H_2(w)^{(p^2-1)/q}$ where $H_2(w)$ is a collision resistant hash function which maps the value w to an element in $F_{p^2}$, p is a prime and q is a prime factor of p+1, and G is the subgroup of $F^*_{p^2}$ of order q.

The present invention also encompasses computing apparatus for implementing the foregoing DAA methods.

DESCRIPTION OF PREFERRED EMBODIMENTS OF THE INVENTION

Embodiments of the invention will now be described, by way of non-limiting example, with reference to the accompanying diagrammatic drawing the sole FIGURE of which is a diagram giving an overview of the main operations of Setup, Join, Sign and Verify phases of a direct anonymous attestation method embodying the invention.

FURTHER DETAILS OF RELEVANT BACKGROUND

To facilitate an appreciation of the present invention, further details will first be given of various underlying techniques and principle, already mentioned in "Background of the Invention", that are utilized by the embodiments of the invention to be described below.

Bilinear Maps

As indicated above, the DAA embodiments to be described below make use of a bilinear map e: $G \times G \rightarrow G$, where G and G denotes two groups of prime order q. The map e satisfies the following properties:

1. Bilinear. For all $P, Q \epsilon G$, and for all a, $b \epsilon Z_q$, $e(P^a, Q^b) = e(P,Q)^{ab}$.
2. Non-degenerate. There exists some $P, Q \epsilon G$ such that $e(P,Q)$ is not the identity of G.
3. Computable. There exists an efficient algorithm for computing $e(P,Q)$ for any $P, Q \epsilon G$.

A bilinear map satisfying the above properties is said to be an admissible bilinear map. Such a bilinear map is also known as the symmetric pairing. In general, one can consider bilinear maps e: $G_1 \times G_2 \epsilon G$ where $G_1$, $G_2$, G are cyclic groups of prime order q. Such a bilinear map is known as the asymmetric pairing (the symmetric pairing is the special case of $G_1 = G_2$).

The following papers, hereby incorporated by reference, give further information on bilinear maps and how to construct an admissible bilinear map from the Tate pairing:

P. S. L. M. Barreto, H. Y. Kim, B. Lynn, and M. Scott. "Efficient algorithms for pairing-based cryptosystems" Advances in Cryptology|CRYPTO '02, volume 2442 of LNCS, pages 354-368. Springer, 2002.

S. D. Galbraith, K. Harrison, and D. Soldera. "Implementing the Tate pairing" Proceedings of the 5th International Symposium on Algorithmic Number Theory, pages 324-337, London, UK, 2002. Springer.

Admissible bilinear maps can also be constructed from the Weil pairing. Details can be found in the paper "Identity-based encryption from the Weil pairing", D. Boneh and M. Franklin; Advances in Cryptology; CRYPTO '01, volume 2139 of LNCS, pages 213-229, Springer, 2001. Existing implementations of the Tate pairing are, however, more efficient than the existing implementations of the Weil pairing.

By way of example, an admissible bilinear map useable in the preferred embodiment described below can be formed from the Tate pairing as follows:

Let p be a prime satisfying p=3 mod 4 and let q be some prime factor of p+1.

Let E be the elliptic curve defined by the equation $y^2 = x^3 - 3x$ over $F_p$. $E(F_p)$ is supersingular and contains p+1 points and $E(F_{p^2})$ contains $(p+1)^2$ points.

Let $g \epsilon E(F_p)$ to a point of order q and let G be the subgroup of points generated by g.

Let G be the subgroup of $F^*_{p^2}$ of order q.

Let $\phi(x; y) = (-x; iy)$ be an automorphism of the group of points on the curve $E(F_p)$, where $i^2 = 1$. Then $\phi$ maps points of $E(F_p)$ to points of $E(F_{p^2}) \backslash E(F_p)$.

Let f be the Tate pairing, then it is possible to define e: $G \times G \rightarrow G$ as:

$$e(P;Q) = f(P; \phi(Q)),$$

where e is an admissible bilinear map.

Protocols for Proof of Knowledge

In the following, various protocols to prove knowledge of and relations among discrete logarithms are used. The notation used to describe these protocols is that introduced by Camenisch and Stadler [J. Camenisch and M. Stadler. "Efficient group signature schemes for large groups" In *Advances in Cryptology—CRYPTO '97*, volume 1296 of LNCS, pages 410-424. Springer, 1997] for various proofs of knowledge of discrete logarithms and proofs of the validity of statements about discrete logarithms. For example:

$$PK\{(a; b): y_1 = (g_1)^a (h_1)^b \wedge y_2 = (g_2)^a (h_2)^b\}$$

denotes a proof of knowledge of integers a and b such that $y_1 = (g_1)^a (h_1)^b$ and $y_2 = (g_2)^a (h_2)^b$, where $y_1$; $g_1$; $h_1$; $y_2$; $g_2$; $h_2$ are elements of some groups $G_1 = (g_1) = (h_1)$ and $G_2 = (g_2) = (h_2)$ and all parameters other than a and b are known to the verifier. Using this notation, a proof of knowledge protocol can be simply described.

In the random oracle model, such proof of knowledge protocols can be turned into signature schemes using the Fiat-Shamir heuristic (see paper referenced above); a signature on a message m obtained in this way is denoted hereinafter as:

$$SPK\{(a): y = z^a\}(m).$$

Camenisch-Lysyanskaya (CL-LRSW) Signature Scheme

The DAA methods set out hereinafter uses the Camenisch-Lysyanskaya (CL-LRSW) signature scheme under the Lysyanskaya, Rivest, Sahai, and Wolf (LRSW) assumption Unlike most signature schemes, the CL-LRSW signature scheme uses bilinear maps and allows for efficient protocols to prove knowledge of a signature and to obtain a signature on a secret message based on proofs of knowledge.

The CL-LRSW signature scheme can be summarized as follows:

Key Generation.

Two groups $G=(g)$ and $\mathcal{G}=(\mathfrak{g})$ of prime order q are chosen and an admissible bilinear map e between G and $\mathcal{G}$. Next choose $x \leftarrow Z_q$ and $y \leftarrow Z_q$, and set the public key as $(q, g, G, \mathfrak{g}, \mathcal{G}, e, X, Y)$ and the secret key as $(x, y)$, where $X=\mathfrak{g}^x$ and $Y=\mathfrak{g}^y$. For simplicity, in the present description, the exponentiation operation $h^a$ for $h \in G$ and an integer a outputs an element in G.

Signature.

On input message m, the secret key $(x, y)$, and the public key $(q, g, G, \mathfrak{g}, \mathcal{G}, e, X, Y)$, choose a random $a \in G$, and output the signature $\sigma=(a, a^y, a^{x+mxy})$.

Verification.

On input the public key $(q, g, G, \mathfrak{g}, \mathcal{G}, e, X, Y)$, the message m, and the signature $\sigma=(a, b, c)$ on m, check whether the following equations hold $e(Y, a)?=e(\mathfrak{g}, b)$, (herein "CL-LRSW Check I")

$e(X, a) \cdot e(X, b)^m ?=e(\mathfrak{g}, c)$ (herein "CL-LRSW Check II")

Observe that from a signature $\sigma=(a, b, c)$ on a message m, it is easy to compute a different signature $\sigma'=(a', b', c')$ on the same message m without the knowledge of the secret key; this is done simply by choosing a random number $r \in Z_q$ and computing $a':=a^r$, $b':=b^r$, $c':=c^r$. A signature formed in this way by exponentiation of the components of an original CL-LRSW signature using a random exponent, is referred to herein as an Alternative CL-LRSW signature; the term is also used where the exponentiation of the original CL-LRSW signature components is more complex (see preferred embodiment) while still enabling the application of the CL-LRSW Checks I & II.

Overview of Embodiments of the Invention

Figure 1:
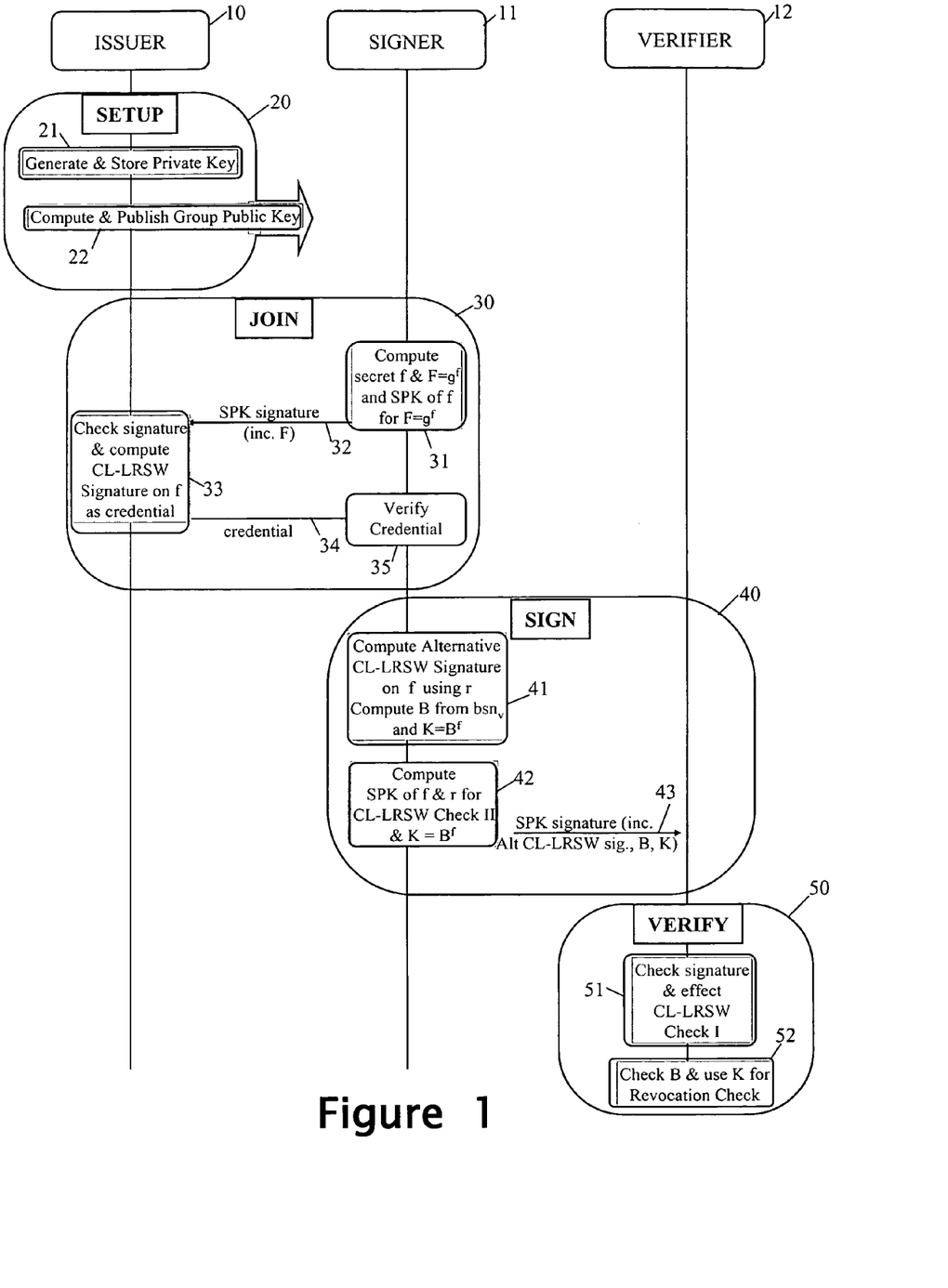

As shown in FIG. 1, DAA systems embodying the invention comprise a first computing entity 10 associated with an Issuer; at least one second computing entity 11 associated with a Signer; and at least one third computing entity 12 associated with a Verifier. The computing entities 10, 11 and 12 are typically based around general-purpose processors executing stored programs but may include dedicated cryptographic hardware modules. The computing entities 10, 11 and 12 inter-communicate as needed via, for example, the internet or other network, though it is also possible that at least some of the entities actually reside on the same computing platform.

In a primary application, the Signer computing entity 11 is a host computer ("Host") with a built-in trusted platform module ("TPM") which can be implemented either in hardware or in software. However, for the purposes of the present overview, the Signer computing entity 11 will be treated as unitary.

In general terms, the Issuer is responsible for providing attestation that an approved Signer is a legitimate member of a particular group (and therefore possesses a particular characteristic); the Issuer does this by providing an approved Signer (characterized by a secret f) with a credential in the form of a CL-LRSW signature on f (f being kept secret by the Signer and only provided in disguised form to the Issuer as a Signer-secret dependent quantity $F=g^f$). The Signer then uses an Alternative form of the CL-LRSW signature credential (derived using a random exponent r) to prove to a Verifier that the Signer has been approved by the Issuer, this process involving a signature proof of knowledge (SPK) by the Signer of f and r. Furthermore, in order to enable a particular Verifier to link together its interactions with a particular Signer, the Signer may generate a quantity B from a basename value $bsn_v$ of the Verifier, as well as a further quantity $K=B^f$, and then provide both B and K to the Verifier; the value of K then enables linkability by the Verifier for the particular Signer concerned. K can also be used to check for revocation of the Signer's credential.

In more detail, the DAA method illustrated in FIG. 1 comprises four phases, namely: Setup 20, Join 30, Sign 40 and Verify 50.

During the Setup phase 20, the Issuer generates and stores a private key (step 21), and establishes system parameters which it publishes in a complementary public key (step 22). The public/private key pair is associated with the group for which the Issuer is to provide membership attestation—if the Issuer has attestation responsibility for more than one group, then the Issuer generates a respective key pair for each group (for simplicity, in the following, only one group and associated key pair will be considered).

During the Join phase 30, in a step 31, the Signer generates its secret f and the derivative value $F=g^f$ where g is a system parameter; the Signer also generates a signature proof of knowledge (SPK) of f for $F=g^f$. The Signer then sends the SPK signature (including F) to the Issuer (arrow 32). In step 33, the Issuer checks the SPK signature to confirm the Signer's knowledge of f, and then computes a CL-LRSW signature on f as the Signer's credential (assuming that the Issuer is willing to grant group membership to the Signer). This CL-LRSW signature credential is then passed to the Signer (arrow 34) which stores it as a secret after, optionally, verifying the credential (step 35) by applying the CL-LRSW checks.

During the Sign phase 40, the Signer attests itself to the Verifier by providing an anonymous form of its credential that the Verifier can verify is based on the credential provided by the Issuer for the Signer with secret f. More particularly, in step 41 the Signer computes an Alternative CL-LRSW signature by exponentiating the components of its CL-LRSW signature credential by random value r. The Signer also computes B from the basename value $bsn_v$ of the Verifier and then computes $K=B^f$. In step 42, the Signer computes a signature proof of knowledge (SPK) of f and r for f & r satisfying both the CL-LRSW Check II (see above) and $K=B^f$. The Signer sends the SPK signature, including the Alternative CL-LRSW signature and B & K, to the Verifier (arrow 43).

During the Verify phase 50, in step 51 the Verifier checks the received SPK signature to confirm Signer's knowledge of f and r. The Verifier also checks that the received Alternative CL-LRSW signature is a valid CL-LRSW signature on f—as the CL-LRSW Check II has been effectively included in the check on the SPK signature (the values of f and r being ones that satisfy Check II), the Verifier need only further effect CL-LRSW Check I. In step 52 the Verifier checks that the received value of B is correctly based on the Verifier's basename value $bsn_v$ thereby confirming that the received value of K is in respect of itself and the Signer characterized by f (because the SPK signature was bound to a value of f satisfying $K=B^f$). The Verifier then checks K against a rogue list of values of K that correspond to revoked credentials.

It will be appreciated that the foregoing is only an overview and does not include certain details such as the messages on which the SPK signatures are formed. It should also be noted that not all elements of the FIG. 1 DAA method are essential; for example, in the Join phase, the Signer can prove its knowledge of f by means other than a signature proof of knowledge, such as by using a short signature scheme. Revocation schemes other than that based on checking K are also possible and, indeed, in some applications the need to provide for revocation is not necessary. The generation of quantities B and K using the basename value $bsn_v$ of a Verifier to enable linkability by the Verifier, may also not be needed in certain applications; however, in the preferred embodiment described below, even where linkability is not required, B and K are still generated but with B being created as a random element in G.

Preferred Embodiment in Detail

For reasons of clarity, the Setup, Join, Sign and Verify phases of the preferred embodiment will first be detailed for a unitary Signer; thereafter, the details of the Join and Sign phases will be repeated for the case of the operations effected by the Signer being split between a Signer TPM and Host.

Setup Let $l_q$, $l_H$ and $l_\phi$ be three security parameters, where $l_q$ is the size of the order q of the groups and $l_H$ is the output length of the hash function used for Fiat-Shamir heuristic, and $l_\phi$ is the security parameter controlling the statistical zero-knowledge property.

The Issuer, who has attestation responsibility for a given group, chooses two groups G=(g) and G=(g) of prime order q and an admissible bilinear map e between G and G, i.e., e: G×G→G (it will, of course, be appreciated that the use of the word 'group' in relation to G and G is in the mathematical sense and such usage is not to be confused with the less formal usage of 'group' earlier in the sentence regarding the group whose membership is to be attested to). The Issuer then chooses $x \leftarrow Z_q$ and $y \leftarrow Z_q$ uniformly at random, and computes $X:=g^x$ and $Y:=g^y$. The Issuer sets the public key associated with the membership group, the group public key, as (q, g, G, g, G, e, X, Y) and its private key as (x, y) and publishes the group public key. Note that the correctness of the group public key can be verified by checking whether each element is in the right group.

Let H(*) and $H_G$(*) be two collision resistant hash functions such that:

$$H: \{0, 1\}^* \to \{0, 1\}^{l_H}$$

$$H_G: \{0, 1\}^* \to G.$$

(One way of constructing $H_G$ is to first construct a hash function $H_1$ such that:

$$H_1: \{0, 1\}^* \to \{0, 1\}^{l_q + l_\phi}$$

To compute $H_G(w)$, first compute $x:=H_1(w) \mod q$ and then set $H_G(w):=g^x$ where $g=e(g, g)$. But see below for potential drawbacks of this approach.)

Join

It is assumed that the Signer and the Issuer have established a one-way authentic channel, i.e., the Issuer is sure that it is talking to the right Signer.

With (q, g, G, g, G, e, X, Y) be the group public key, $K_I$ a long-term public key of the Issuer, and 'DAAseed' a seed for computing the secret key of the Signer.

The Join protocol comprises the following steps:
1. The Signer computes $$f:=H(DAAseed\|K_I) \mod q, \quad F:=g^f,$$

where ∥ represents the operation of concatenation.
2. The Signer proves its knowledge of f to the Issuer by computing the signature of knowledge:

$$SPK \{(f): F=g^f\}(n_I\|n_T)$$

as follows:
   (a) The Signer chooses a random $r_f \leftarrow Z_q$ and computes $T:=g^{r_f}$.
   (b) The Issuer chooses a nonce $n_I \in \{0, 1\}^{l_H}$ and sends $n_I$ to the Signer.
   (c) The Signer chooses a nonce $n_T \in \{0, 1\}^{l_\phi}$ and computes $$e:=H(q\|g\|g\|X\|Y\|F\|T\|n_I\|n_T).$$

$$s_f := r_f + e \cdot f \mod q.$$

(d) The Signer sets f as its private key and sends the SPK signature (F, e, $s_f$, $n_T$) to the Issuer.
3. The Issuer checks its records and policy to find out whether the value F should be rejected or not. If F belongs to a rogue Signer or does not pass the Issuer's policy check, e.g. having been required for a credential too many times, the Issuer aborts the protocol.
4. Assuming the check in (3) is passed, the Issuer computes $T:=g^{s_f} F^{-e}$ and verifies that:

$$e? = H(q\|g\|g\|X\|Y\|F\|T\|n_I\|n_T).$$

If this check fails, the Issuer aborts the protocol.
5. Assuming the check in (4) is passed, the Issuer now chooses $r \leftarrow Z_q$, and computes:

$$a:=g^r, \quad b:=a^y, \quad c:=a^{x} F^{rxy}.$$

Note that $c = a^x g^{frxy} = a^{x+fxy}$ and that (a, b, c) is therefore a CL-LRSW signature on f. The issuer sets this CL-LRSW signature (a, b, c) to be the credential for the Signer and sends (a, b, c) to the Signer.
8. The Signer may optionally wish to verify that (a, b, c) is an CL-LRSW signature on f, if so the Signer carries out the CL-LRSW Checks I and II in respect of signature (a, b, c) and f.

Sign (Note that the quantities r, $r_f$, $s_f$, $n_T$, and e are newly generated in Sign and their values are not carried over from Join).

The Signer has a membership private key (f, a, b, c). Let m be the input message the Signer wants to sign (as in the original DAA scheme, m is preferably presented as b∥m' where b=0 means that the message m' is generated by the Signer and b=1 means that m' was input to the Signer). Further, let $bsn_V$ be a basename value provided by the Verifier, and $n_V \in \{0, 1\}^{l_H}$ be a nonce chosen by the Verifier. The signing algorithm involves the following steps:
1. Depending on the Verifier's request (i.e., whether $bsn_v = \perp$ or not), the Signer computes B as follows $$B \leftarrow^R G \text{ or } B := H_G(1\|bsn_v).$$

where $B \leftarrow^R G$ means that B is chosen from G uniformly at random.

The Signer then computes:

$$K := B^f.$$

2. The Signer chooses random r, $r' \leftarrow Z_q$ and computes $$a' := a^{r'}, \quad b' := b^{r'}, \quad c' := c^{r' r^{-1}}$$

The triple (a', b', c') constitutes an Alternative CL-LRSW signature on f based on the CL-LRSW signature (a, b, c), notwithstanding that c has been raised to the power ($r'r^{-1}$) rather than r' as a and b (this variation does not affect CL-LRSW Check I and can be compensated for in CL-LRSW Check II by introducing r into the right-hand side of the Check). The reason to raise c to the power ($r'r^{-1}$) rather than r' is to prevent the Issuer being able to identify Alternative signature forms of its CL-LRSW signature (a, b, c) on f, thereby eliminating the possibility of linkability by the Issuer.

3. The Signer computes $$v_x:=e(X, a'), v_{xy}:=e(X, b'), v_s:=e(g, c').$$

As an alternative to the approach set out in (2) and (3) above, the Signer can carry out a one time computation:

$$A:=e(X, a) \; B:=e(X, b), \; C:=e(g, c),$$

and store (A, B, C) for reuse; thereafter, whenever the Signer needs to carry out the Sign phase, the Signer simply replaces (2) and (3) above by computing:

$$v_x:=A^{r'}, v_{xy}:=B^{r'}, v_s:=C^{r'r-1}.$$

4. The Signer computes a "signature of knowledge"

$$SPK \{(r, f): (v_s)^r = v_x (v_{xy})^f \; K = B^f\} (n_V \| n_T \| m)$$

Note that verification of this signature verifies $(v_s)^r = v_x (v_{xy})^f$ which is the CL-LRSW Check II for the CL-LRSW signature (a', b', c') on f.

This signature of knowledge is computed as follows:
  (a) The Signer chooses two random integers $r_r, r_f \in Z_q$ and computes $$T_1:=(v_s)^{r_r}(v_{xy})^{-r_f}, \; T_2:=B^{r_f}.$$

(b) The Signer chooses a nonce $n_T \in \{0, 1\}^{l_\phi}$ computes $$e:=H (q\|g\|g\|X\|Y\|a'\|b'\|c'\|v_x\|v_{xy}\|v_s\|B\|K\|T_1\|T_2\|m\|n_T\|n_V).$$

(c) The Signer computes $$s_r:=r_r+e\cdot r \bmod q, \; s_f:=r_f+e\cdot f \bmod q$$

4. The Signer outputs the signature $\sigma=(B, K, a', b', c', e, s_r, s_f, n_T)$.

Verify

To verify candidate signature $\sigma=(B, K, a', b', c', e, s_r, s_f, n_T)$ on a message formed from m and the two nonces $n_V$ and $n_T$, the Verifier, given the group public key (q, g, G, g, G, e, X, Y) proceeds as follows:

1. If $bsn_V \neq \bot$, the Verifier verifies that $B?=H_G(1\|bsn_V)$, otherwise, the Verifier verifies that $B \in G$.
2. For each $f_i$ in the rogue list, the Verifier checks that $K? \neq B^{f_i}$. If K matches with any $f_i$ in the rogue list, the Verifier outputs 'reject' and aborts.
3. Assuming the check in (2) is passed, the Verifier checks that $$e(Y, a')?=e(g, b'), \; K? \in G.$$

The first of these checks corresponds to the CL-LRSW Check I for the signature (a', b', c') on f.
4. The Verifier computes $$v_x:=e(X, a'), v_{xy}:=e(X, b'), v_s:=e(g, c').$$

$$T_1:=(v_s)^{s_r}(v_{xy})^{-s_f}(v_x)^{-1}, \; T_2:=B^{s_f}K^{-1}.$$

5. The Verifier checks that $$e?=H (q\|g\|g\|X\|Y\|a'\|b'\|c'\|v_x\|v_{xy}\|v_s\|B\|K\|T_1\|T_2\|m\|n_T\|n_V).$$

6. If all the above checks succeed, the Verifier outputs 'accept', otherwise the Verifier outputs 'reject'.

It was earlier mentioned that one way of implementing the hash function $H_G$ used in deriving the point B from the basename value $bsn_v$ was by the intermediate use of an ordinary hash function $H_1(\;)$ whereby for $bsn_v \neq \bot$:

$$B=H_G(1\|bsn_v)=g^{H_1(1\|bsn_v) \bmod q}=e(g,g)^{H_1(1\|bsn_v) \bmod q}$$

However, such an approach allows the Issuer and Verifier to collude to break the anonymity of the Signer. The Issuer knows the value of $g^f$ as F which is given in the Join process. In the Sign process, Signer computes $K=B^f$, which is sent to the Verifier. Obviously if the Issuer and Verifier put their knowledge together, they will get $$B^f=e(g^f, g)^{H_1(1\|bsn_v)}$$

and then find out the Signer. There are a number of possibilities for deriving B more securely from $bsn_v$:

1. Use a collision resistant hash function $H_2(w)$, which maps the value w to an element in $F_{p^2}$, to compute $B=H_2(w)^{(p^2-1)/q}$.
2. Use a MapToPoint function $H_3(w)$ to map the value w to an element of G, that can guarantee nobody knows the discrete log relation between g and $H_3(w)$, and then compute $B:=e(H_3(w); H_3(w))$.

MapToPoint functions are described in the paper "Identity-based encryption from the Weil pairing", D. Boneh and M. Franklin; Advances in Cryptology; CRYPTO '01, volume 2139 of LNCS, pages 213-229, Springer, 2001.
3. As in the original DAA scheme, make a cyclic group different from either G or G, in which the discrete logarithm problem is hard, and then compute B in this group instead of G.

Signer Split Between TPM & Host

The Join and Sign phases of the above-described preferred embodiment are re-stated below with the operations effected by the Signer split between a Signer Host and Signer TPM to minimize computational load of the TPM while tying the credential securely to the TPM. Technical details for providing a computing platform a TPM can be found in the TCG specifications, available at http://www.trustedcomputing-group.org.

Join

1. The TPM computes $$f:=H(DAAseed\|K_I) \bmod q, \; F:=g^f,$$

where $\|$ represents the operation of concatenation.
   The TPM then chooses a random $r_f \in Z_q$, computes $T:=g^{r_f}$, and sends T and F to the Host.
2. The Issuer chooses a random string $n_I \in \{0, 1\}^{l_H}$ and sends $n_I$ to the Host.
3. The Host computes $$e_H:=H(q\|g\|g\|X\|Y\|F\|T\|n_I).$$

and sends $e_H$ to the TPM.
4. The TPM chooses a random string $n_T \in \{0, 1\}^{l_\phi}$ and computes:

$$:=H(e_H\|n_T).$$

$$s_f:=r_f+e\cdot f \bmod q.$$

The TPM sets f as its private key and sends (F, e, $s_f$, $n_T$) to the Issuer through the Host.
5. The Issuer checks its records and policy to find out whether the value F should be rejected or not. If F belongs to a rogue TPM or does not pass the Issuer's policy check, e.g. having been required for a credential too many times, the Issuer aborts the protocol.
6. Assuming the check in (5) is passed, the Issuer computes $T:=g^{s_f}F^{-e}$ and verifies that:

$$e?=H(H(q\|g\|g\|X\|Y\|F\|T\|n_I)\|n_T).$$

If this check fails, the Issuer aborts the protocol.

7. Assuming the check in (6) is passed, the Issuer now chooses $r \leftarrow Z_q$, and computes a CL-LRSW signature on f:

$$a := g^r, \; b := a^y, \; c := a^x F^{rxy}.$$

The issuer sets (a, b, c) to be the credential for the TPM and sends (a, b, c) to the Signer.

8. The Signer may optionally wish to verify that (a, b, c) is an CL-LRSW signature on f, if so, the TPM computes $d = b^f$ and sends it to the Host who then carries out the CL-LRSW Checks in respect of signature (a, b, c) on f but with Check II now in the form: e(X, ad)?=e(g, c); the Host also checks that: e(g, d)?=e(F, b) to confirm the relationship of d to f.

Sign (Note that the quantities r, $r_f$, $s_f$, $n_T$, and c are newly generated in Sign and their values are not carried over from Join).

1. Depending on the Verifier's request (i.e., whether $bsn_V = \perp$ or not), the Host computes B as follows:

$$B \leftarrow^R G \text{ or } B := H_G(1 \| bsn_V).$$

where $B \leftarrow^R G$ means that B is chosen from G uniformly at random. The Host sends B to the TPM. The TPM verifies that $B \in G$ then computes:

$$K := B^f.$$

and sends K to the Host.

2. The Host chooses random r, $r' \leftarrow Z_q$ and computes an Alternative CL-LRSW signature:

$$a' := a^r, \; b' := b^r, \; c' := c^{rr'-1}$$

3. The Host also computes $$v_x := e(X, a'), \; v_{xy} := e(X, b'), \; v_s := e(g, c').$$

and sends $v_{xy}$ back to the TPM which verifies that $v_{xy} \in G$. The Host may replace (3), (4) with the alternative discussed above in respect of the unitary Signer scenario.

4. The TPM and Host jointly compute a "signature of knowledge"

$$SPK \{(r, f): (v_s)^r = v_x (v_{xy})^f \; K = B^f\}(n_V \| n_T \| m)$$

as follows:
(i) The Host chooses a random integer $r_r \in Z_q$ and computes $$T_{1t} := (v_s)^{r_r}$$

(ii) The Host computes:

$$e_H := H(q \| g \| g \| X \| Y \| a \| b \| c \| v_x \| v_{xy} \| v_s \| B \| K \| n_V)$$

and sends $e_H$ and $T_{1t}$ to the TPM.
(iii) The TPM chooses a random integers $r_f \in Z_q$ and a nonce $n_T \in \{0, 1\}^{l_\phi}$
(iv) The TPM then computes:

$$T_1 := T_{1t}(v_{xy})^{-r_f}, \; T_2 := B^{r_f}.$$

$$e := H(e_H \| T_1 \| T_2 \| n_T \| m).$$

$$s_f := r_f + e \cdot f \bmod q$$

and sends e, $s_f$, $n_T$ to the Host.
(v) The Host computes $$s_r := r_r + e \sim r \bmod q,$$

4. The Host outputs the signature $\sigma = (B, K, a', b', c', e, s_r, s_f, n_T)$.

It may be noted that in (3) of the Sign phase the TPM verifies that $v_{xy} \in G$. If $v_{xy}$ is not in a right group, the value $(v_{xy})^{-r_f}$ might disclose the value $r_f$ and then the value f will be disclosed from $s_f$. In seeking to exploit this potential weakness the Host could attempt several of ways of figuring out f with a reduced computation cost. For example, the Host could first guess $(v_{xy})^{-r_f}$ and $T_1$ by searching for the right hash input. The number of different $(v_{xy})^{-r_f}$ should not be large if $v_{xy}$ is of a small order. Alternatively, the Host could guess $(v_{xy})^{e_f}$ and $T_1$ again by searching the hash input. The searching cost is not based on the size of the large group, but the order of $v_{xy}$.

It may also be noted that as the only secret of the TPM is the value f, only $r_f$ and $s_f$ need be generated by TPM with the Host being allowed to choose and compute $s_r$ and $(v_s)^{r_r}$. This significantly reduces the TPM processing load without reducing security as compared with having all the values r, r', $r_r$, $r_f$, $s_r$, $(v_s)^{r_r}$ and $s_f$ chosen or computed by the TPM level. In particular, there is no point in having r and r' chosen by TPM as it does not control how these two numbers are used by the Host afterwards, except computing $s_r$. However, the computation of $s_r$ does not offer TPM any control power, since the Host is able to get the value $r_r$ and even to modify the values r and $s_r$ if it wants. So it does not make any difference if the Host chooses $r_r$ and then compute $s_r$.

Variants

It will be appreciated that many variants are possible to the above described embodiments of the invention. As already indicated, the Signer may be unitary and not split between a TPM and Host; the use of B and K to enable linkability by the Verifier may be omitted in appropriate cases as may provision for revocation; and the signature proof of knowledge during the Join phase can be replaced by a different proof of knowledge. Furthermore, as will be apparent to persons skilled in the art, many minor variations are possible regarding the computation and form of the signatures and other quantities. It is also possible to use different type of pairings instead of the symmetric one. The paper "Identity-based key agreement protocols from pairings" by L. Chen, Z. Cheng and N. Smart; *International Journal of Information Security,* 6 (4):213-241, Springer Berlin/Heidelberg, 2007, discussed how to use different types of pairings in identity-based key agreement protocols and the principles disclosed in that paper can be applied to the above described DAA embodiments.

In the foregoing where the functions of a Signer have been between the Host computing platform and another entity, that other entity has taken the form of a TPM (Trusted Platform Module); however, such other (or 'associated') entity is not limited to being a TPM compliant with the TCG Specification. The 'associated' entity whether implemented in hardware or software, need only be one that provides an environment for storing secrets and effecting processing securely (that is, without giving other Host processes or components the opportunity to access such secrets or interfere with processing).

The invention claimed is:

1. A Direct Anonymous Attestation, DAA, method by which a Signer computing entity uses a credential supplied by an Issuer to prove to a Verifier without the identity of the Signer being revealed, Issuer attestation to the Signer's possession of a particular characteristic, the method using a non-degenerate, computable, bilinear map e of the form: $G_1 \times G_2 \in G$ where $G_1$, $G_2$, and G are cyclic groups, and the credential being a CL-LRSW signature on a secret f known only to the Signer; the method comprising the Signer computing entity:

forming an Alternative CL-LRSW signature by exponentiation, using a random exponent, of components of the credential;

forming a signature proof of knowledge, incorporating the Alternative CL-LRSW signature, to prove knowledge of the secret f and the random exponent; and sending the signature proof of knowledge to the Verifier;
the Signer computing entity comprising a Host with an associated entity that possesses the characteristic attested to by the credential and holds the secret f secret from the Host; the Host and the associated entity cooperating in the forming of the signature proof of knowledge, wherein the signature proof of knowledge comprises:
the Host using a component of the Alternate CL-LRSW signature and the map e to compute an element in G which the Host then provides to the associated entity;
the associated entity using this element to compute a component of the signature proof of knowledge; and
associated entity checking that the element provided by the Host belongs to G.

2. A DAA method according to claim 1, wherein the element in G computed by the Host is computed as e(X, b') where X is a public parameter made available by the Issuer and b' is said component of the credential after exponentiation of the component by the random exponent.

3. A DAA method according to claim 1, wherein the Host generates said random exponent and uses it to form the Alternative CL-LRSW signature by exponentiation of the credential components.

4. A DAA method according to claim 1, wherein the Alternative CL-LRSW takes the form: $a^{r'}$, $b^{r'}$, $c^{r'}$ where a, b, c are components of the credential and r' is the random exponent.

5. A DAA method according to claim 1, wherein the Alternative CL-LRSW takes the form: $a^{r'}$, $b^{r'}$, $c^{r'r^{-1}}$ where a, b, c are components of the credential, r' is the random exponent and r is a further random value generated by the Host.

6. A DAA method according to claim 1, further comprising the Signer computing entity forming an element B in G and computing $K=B^f$; the signature proof of knowledge further incorporating B and K and serving to prove knowledge of the secret f under the condition $K=B^f$.

7. A DAA method according to claim 6, wherein the Signer computing entity selectively whereby to enable linkability by the Verifier, forms B in G by hashing a value w that is dependent on a basename of the Verifier whereby to enable linkability by the Verifier, the Signer computing entity otherwise choosing B uniformly at random in G.

8. A DAA method according to claim 1, wherein $G_1=G_2$.

9. A DAA method according to claim 1, wherein the bilinear map e comprises an asymmetric pairing.

10. A DAA method by which a Signer computing entity uses a credential supplied by an Issuer to prove to a Verifier, without the identity of the Signer being revealed, Issuer attestation to the Signer's possession of a particular characteristic, the method using a non-degenerate, computable, bilinear map e of the form: $G_1 \times G_2 \in G$ where $G_1$, $G_2$, and G are cyclic groups, and the credential being a CL-LRSW signature on a secret f known only to the Signer; the method comprising the Signer computing entity:
computing an Alternative CL-LRSW signature by exponentiation, using a random exponent, of components of the credential;
computing a signature proof of knowledge, incorporating the Alternative CL-LRSW signature, to prove knowledge of the secret f and the random exponent; and
sending the signature proof of knowledge to the Verifier;
the Signer computing entity comprising a Host with an associated entity that possesses the characteristic attested to by the credential and holds the secret f secret from the Host; the Host generating said random exponent and using the random exponent to form the Alternative CL-LRSW signature by exponentiation of the credential components.

11. A DAA method according to claim 10, wherein the Alternative CL-LRSW takes the form: $a^{r'}$, $b^{r'}$, $c^{r'}$ where a, b, c are components of the credential and r' is the random exponent.

12. A DAA method according to claim 10, wherein the Alternative CL-LRSW takes the form: $a^{r'}$, $b^{r'}$, $c^{r'r^{-1}}$ where a, b, c are components of the credential, r' is the random exponent and r is a further random value generated by the Host.

13. A DAA method according to claim 10, further comprising the Signer computing entity forming an element B in G and computing $K=B^f$; the signature proof of knowledge further incorporating B and K and serving to prove knowledge of the secret f under the condition $K=B^f$.

14. A DAA method according to claim 13, wherein the Signer computing entity selectively whereby to enable linkability by the Verifier, forms B in G by hashing a value w that is dependent on a basename of the Verifier whereby to enable linkability by the Verifier, the Signer computing entity otherwise choosing B uniformly at random in G.

15. A DAA method according to claim 10, wherein $G_1=G_2$.

16. A DAA method according to claim 10, wherein the bilinear map e comprises an asymmetric pairing.

17. A DAA method in which a Signer computing entity uses a credential supplied by an Issuer to prove to a Verifier, without the identity of the Signer being revealed, Issuer attestation to the Signer's possession of a particular characteristic, the method using a non-degenerate, computable, bilinear map e of the form: $G_1 \times G_2 \in G$ where $G_1$, $G_2$, and G are cyclic groups, and the credential being a CL-LRSW signature on a secret f known only to the Signer; the method including the Signer computing entity:
forming an element B in G from a value w dependent on a basename of the Verifier by computing B as $e(H_3(w); H_3(w))$ where $H_3(w)$ is a MapToPoint function for mapping the value w to an element of G, having a generator g, that can guarantee nobody knows the discrete log relation between g and $H_3(w)$; and
sending to the Verifer a signature proof of knowledge that incorporates the element B.

18. A DAA method according to claim 17, the method further including the Signer computing entity:
computing $K=B^f$;
forming an Alternative CL-LRSW signature by exponentiation, using a random exponent, of components of the credential; and
forming the signature proof of knowledge by incorporating the Alternative CL-LRSW signature, B and K, to prove knowledge both of the secret f under the condition $K=B^f$, and of the random exponent.

19. A DAA method according to claim 17, wherein $G_1=G_2$.

20. A DAA method in which a Signer computing entity uses a credential supplied by an Issuer to prove to a Verifier, without the identity of the Signer being revealed, Issuer attestation to the Signer's possession of a particular characteristic, the method using a non-degenerate, computable, bilinear map e of the form: $G_1 \times G_2 \in G$ where $G_1$, $G_2$, and G are cyclic groups, and the credential being a CL-LRSW signature on a secret f known only to the Signer; the method including the Signer computing entity:
forming an element B in G from a value w dependent on a basename of the Verifier by computing B as $H_2(w)^{(p^2-1)/q}$ where $H_2(w)$ is a collision resistant hash function which maps the value w to an element in $F_{p^2}$, p is a prime and q is a prime factor of p+1, and G is the subgroup of $F^*_{p^2}$ of order q; and sending to the Verifer a signature proof of knowledge that incorporates the element B.

21. A DAA method according to claim 20, the method further including the Signer computing entity:

computing $K=B^f$;

forming an Alternative CL-LRSW signature by exponentiation, using a random exponent, of components of the credential;

forming the signature proof of knowledge by incorporating the Alternative CL-LRSW signature, B and K, to prove knowledge both of the secret f under the condition $K=B^f$, and of the random exponent.

22. A DAA method according to claim 20, wherein $G_1=G_2$.

23. A DAA method according to claim 20, wherein the bilinear map e comprises an asymmetric pairing.

24. Computing apparatus arranged to serve as a Signer computing entity in a Direct Anonymous Attestation, DAA, method in which the Signer computing entity uses a credential supplied by an Issuer to prove to a Verifier without the identity of the Signer being revealed, Issuer attestation to the Signer's possession of a particular characteristic, the method using a non-degenerate, computable, bilinear map e of the form: $G_1 \times G_2 \epsilon G$ where $G_1$, $G_2$, and G are cyclic groups, and the credential being a CL-LRSW signature on a secret f known only to the Signer; wherein:

the computing apparatus comprises a Host with an associated entity that possesses the characteristic attested to by the credential and holds the secret f secret from the Host;

the computing apparatus is arranged to:

form an Alternative CL-LRSW signature by exponentiation, using a random exponent, of components of the credential;

form a signature proof of knowledge, incorporating the Alternative CL-LRSW signature, to prove knowledge of the secret f and the random exponent; and send the signature proof of knowledge to the Verifier; and the Host and the associated entity are arranged to cooperate in the generation of the signature proof of knowledge with the Host being arranged to use a component of the Alternate CL-LRSW signature and the map e to compute an element in G and then to provide this element to the associated entity, and the associated entity being arranged to use the element provided by the Host to compute a component of the signature proof of knowledge, the associated entity being further arranged to check that the element provided by the Host belongs to G.

25. A DAA method according to claim 24, wherein the bilinear map e comprises an asymmetric pairing.

* * * * *

UNITED STATES PATENT AND TRADEMARK OFFICE
CERTIFICATE OF CORRECTION

| | | |
|---|---|---|
| PATENT NO. | : 8,225,098 B2 | Page 1 of 1 |
| APPLICATION NO. | : 12/322368 | |
| DATED | : July 17, 2012 | |
| INVENTOR(S) | : Liqun Chen | |

It is certified that error appears in the above-identified patent and that said Letters Patent is hereby corrected as shown below:

In column 13, line 7, in Claim 1, after "wherein" insert -- forming --.

In column 13, line 14, in Claim 1, before "associated" insert -- the --.

In column 14, line 40, in Claim 17, delete "G," and insert -- G --, therefor.

In column 14, line 43, in Claim 17, delete "Verifer" and insert -- Verifier --, therefor.

In column 15, line 4, in Claim 20, delete "Verifer" and insert -- Verifier --, therefor.

Signed and Sealed this
Twenty-second Day of January, 2013

David J. Kappos
*Director of the United States Patent and Trademark Office*